US008495007B2

(12) United States Patent
Williamson

(10) Patent No.: US 8,495,007 B2
(45) Date of Patent: Jul. 23, 2013

(54) SYSTEMS AND METHODS FOR HIERARCHICAL AGGREGATION OF MULTI-DIMENSIONAL DATA SOURCES

(75) Inventor: Eric Williamson, Holly Springs, NC (US)

(73) Assignee: Red Hat, Inc., Raleigh, NC (US)

( * ) Notice: Subject to any disclaimer, the term of this patent is extended or adjusted under 35 U.S.C. 154(b) by 427 days.

(21) Appl. No.: 12/200,101

(22) Filed: Aug. 28, 2008

(65) Prior Publication Data

US 2010/0057700 A1    Mar. 4, 2010

(51) Int. Cl.
    *G06F 7/00*      (2006.01)
    *G06F 17/00*     (2006.01)
(52) U.S. Cl.
    USPC ............................................ 707/607; 707/756
(58) Field of Classification Search
    None
    See application file for complete search history.

(56) References Cited

U.S. PATENT DOCUMENTS

| | | | |
|---|---|---|---|
| 5,649,180 A * | 7/1997 | Danno et al. | 1/1 |
| 5,890,151 A * | 3/1999 | Agrawal et al. | 1/1 |
| 5,890,167 A | 3/1999 | Bridge, Jr. et al. | |
| 5,978,796 A * | 11/1999 | Malloy et al. | 1/1 |
| 6,161,103 A * | 12/2000 | Rauer et al. | 1/1 |
| 6,189,004 B1 * | 2/2001 | Rassen et al. | 1/1 |
| 6,212,524 B1 * | 4/2001 | Weissman et al. | 707/600 |
| 6,301,579 B1 | 10/2001 | Becker | |
| 6,360,188 B1 | 3/2002 | Freidman et al. | |
| 6,366,905 B1 * | 4/2002 | Netz | 707/600 |
| 6,366,922 B1 * | 4/2002 | Althoff | 707/706 |
| 6,434,435 B1 | 8/2002 | Tubel et al. | |
| 6,434,544 B1 * | 8/2002 | Bakalash et al. | 1/1 |
| 6,594,672 B1 * | 7/2003 | Lampson et al. | 1/1 |
| 6,609,123 B1 * | 8/2003 | Cazemier et al. | 1/1 |
| 6,735,590 B1 * | 5/2004 | Shoup et al. | 1/1 |
| 6,898,560 B1 * | 5/2005 | Das | 703/7 |
| 6,931,418 B1 * | 8/2005 | Barnes | 707/776 |
| 7,152,062 B1 | 12/2006 | Draper et al. | |
| 7,299,241 B2 | 11/2007 | Reed et al. | |
| 7,340,476 B2 * | 3/2008 | Arras et al. | 707/752 |
| 7,660,822 B1 * | 2/2010 | Pfleger | 707/999.107 |
| 7,739,224 B1 * | 6/2010 | Weissman et al. | 707/794 |
| 7,761,407 B1 * | 7/2010 | Stern | 707/602 |
| 2001/0049678 A1 * | 12/2001 | Yaginuma | 707/3 |

(Continued)

OTHER PUBLICATIONS

Using OLAP and Multi-dimensional data for decision making, Hasan et al, IEEE 2001.*
A new OLAP aggregation based on the AHC technique, Massaoud et al, DOLAP'04 Nov. 12-13, 2004.*
Interactive hierarchical dimension ordering, spacing and filtering for exploration of high dimension datasets, Yang et al, IEEE symposium on information visualization 2003.*

(Continued)

*Primary Examiner* — Pierre Vital
*Assistant Examiner* — Augustine K Obisesan
(74) *Attorney, Agent, or Firm* — Lowenstein Sandler LLP

(57) ABSTRACT

Embodiments relate to systems and methods for aggregating data from data sources according to a hierarchical mapping generated from dimensions of the data sources. A set of applications such as online analytical processing (OLAP) applications can access the combined data of a set of multi-dimensional data sources via a transform engine. The set of data sources can be configured with diverse dimensions and associated data, which in general do not reflect a strictly hierarchical structure. In embodiments, the transform engine can combine or aggregate the set of data sources using common dimensions or data points, and build an index into a transform table reflecting the hierarchical level of dimension from each data source in a combined hierarchical mapping. An OLAP or other application can therefore perform searches, sorts, and/or other operations on the combined hierarchical mapping based on the resulting ordering of data, even when the original multi-dimensional data sources do not contain an explicit common hierarchy.

13 Claims, 4 Drawing Sheets

U.S. PATENT DOCUMENTS

| | | |
|---|---|---|
| 2002/0029207 A1* | 3/2002 | Bakalash et al. ............... 707/1 |
| 2002/0035562 A1 | 3/2002 | Roller et al. |
| 2002/0059195 A1* | 5/2002 | Cras et al. ..................... 707/3 |
| 2002/0083034 A1* | 6/2002 | Orbanes et al. ................ 707/1 |
| 2002/0087516 A1* | 7/2002 | Cras et al. ..................... 707/2 |
| 2002/0089550 A1* | 7/2002 | Orbanes et al. ............. 345/853 |
| 2002/0169658 A1 | 11/2002 | Adler |
| 2002/0194163 A1* | 12/2002 | Hopeman et al. .............. 707/3 |
| 2002/0194196 A1* | 12/2002 | Weinberg et al. ......... 707/104.1 |
| 2003/0004938 A1* | 1/2003 | Lawder .......................... 707/3 |
| 2003/0014417 A1* | 1/2003 | Kelkar ........................ 707/100 |
| 2003/0114950 A1* | 6/2003 | Ruth et al. .................... 700/108 |
| 2003/0115194 A1 | 6/2003 | Pitts et al. |
| 2003/0115207 A1* | 6/2003 | Bowman et al. ............ 707/100 |
| 2003/0120372 A1* | 6/2003 | Ruth et al. .................... 700/108 |
| 2003/0126114 A1 | 7/2003 | Tedesco |
| 2003/0126143 A1 | 7/2003 | Roussopoulos et al. |
| 2003/0154443 A1* | 8/2003 | Papierniak et al. .......... 715/502 |
| 2003/0184585 A1 | 10/2003 | Lin et al. |
| 2003/0195897 A1* | 10/2003 | Agrafiotis et al. ........... 707/100 |
| 2003/0200191 A1 | 10/2003 | Pao et al. |
| 2003/0200221 A1* | 10/2003 | Bakalash et al. ............ 707/100 |
| 2003/0225736 A1* | 12/2003 | Bakalash et al. ................ 707/1 |
| 2004/0015507 A1* | 1/2004 | Netz et al. .................... 707/100 |
| 2004/0039736 A1 | 2/2004 | Kilmer et al. |
| 2004/0133552 A1* | 7/2004 | Greenfield et al. ............. 707/1 |
| 2004/0139061 A1* | 7/2004 | Colossi et al. .................. 707/3 |
| 2004/0236767 A1* | 11/2004 | Soylemez et al. ............ 707/100 |
| 2005/0004904 A1* | 1/2005 | Kearney et al. ................. 707/3 |
| 2005/0010566 A1* | 1/2005 | Cushing et al. ................. 707/3 |
| 2005/0015360 A1* | 1/2005 | Cras et al. ..................... 707/2 |
| 2005/0060300 A1* | 3/2005 | Stolte et al. .................... 707/3 |
| 2005/0060382 A1 | 3/2005 | Spector et al. |
| 2005/0262108 A1* | 11/2005 | Gupta .......................... 707/100 |
| 2005/0262120 A1* | 11/2005 | Shoup et al. ................. 707/100 |
| 2005/0289119 A1* | 12/2005 | Weinberg et al. ................ 707/2 |
| 2006/0004816 A1 | 1/2006 | Diewald et al. |
| 2006/0004833 A1* | 1/2006 | Trivedi et al. ................ 707/102 |
| 2006/0026189 A1* | 2/2006 | Djugash et al. .............. 707/102 |
| 2006/0031187 A1 | 2/2006 | Pyrce et al. |
| 2006/0036707 A1 | 2/2006 | Singh et al. |
| 2006/0116975 A1* | 6/2006 | Gould et al. .................... 707/1 |
| 2006/0116976 A1* | 6/2006 | Legault et al. .................. 707/1 |
| 2006/0136462 A1 | 6/2006 | Campos et al. |
| 2006/0179061 A1 | 8/2006 | D'Souza et al. |
| 2006/0206512 A1* | 9/2006 | Hanrahan et al. ............. 707/102 |
| 2006/0262145 A1* | 11/2006 | Zhang et al. ................... 345/661 |
| 2007/0022093 A1* | 1/2007 | Wyatt et al. ..................... 707/2 |
| 2007/0027904 A1* | 2/2007 | Chow et al. ................. 707/102 |
| 2007/0027930 A1 | 2/2007 | Alvarado et al. |
| 2007/0088757 A1 | 4/2007 | Mullins et al. |
| 2007/0094236 A1* | 4/2007 | Otter et al. ...................... 707/2 |
| 2007/0130116 A1* | 6/2007 | Cras et al. ....................... 707/2 |
| 2007/0156634 A1* | 7/2007 | Martin ............................. 707/1 |
| 2007/0162472 A1 | 7/2007 | Wan et al. |
| 2007/0208721 A1* | 9/2007 | Zaman et al. ................... 707/4 |
| 2007/0250524 A1* | 10/2007 | Le ................................ 707/102 |
| 2008/0140696 A1 | 6/2008 | Mathuria |
| 2008/0162562 A1* | 7/2008 | Hu et al. .................... 707/104.1 |
| 2008/0172405 A1* | 7/2008 | Feng et al. ................... 707/102 |
| 2008/0222189 A1* | 9/2008 | Ovanesyan et al. ........... 707/102 |
| 2008/0243778 A1* | 10/2008 | Behnen et al. ................. 707/3 |
| 2008/0294596 A1* | 11/2008 | Xiong ............................ 707/2 |
| 2008/0320023 A1 | 12/2008 | Fong |
| 2009/0037440 A1* | 2/2009 | Will et al. .................... 707/100 |
| 2009/0193039 A1 | 7/2009 | Bradley et al. |
| 2009/0217147 A1* | 8/2009 | Thomsen ..................... 715/214 |
| 2009/0222470 A1* | 9/2009 | Kemp et al. ................. 707/102 |
| 2010/0057777 A1 | 3/2010 | Williamson |
| 2010/0131456 A1 | 5/2010 | Williamson |
| 2010/0169299 A1 | 7/2010 | Pollara |
| 2010/0305922 A1 | 12/2010 | Williamson |
| 2010/0306254 A1 | 12/2010 | Williamson |
| 2010/0306255 A1 | 12/2010 | Williamson |
| 2010/0306272 A1 | 12/2010 | Williamson |
| 2010/0306281 A1 | 12/2010 | Williamson |
| 2010/0306340 A1 | 12/2010 | Williamson |
| 2010/0306682 A1 | 12/2010 | Williamson |
| 2011/0050728 A1 | 3/2011 | Williamson |
| 2011/0054854 A1 | 3/2011 | Williamson |
| 2011/0055680 A1 | 3/2011 | Williamson |
| 2011/0055761 A1 | 3/2011 | Williamson |
| 2011/0055850 A1 | 3/2011 | Williamson |
| 2011/0078199 A1 | 3/2011 | Williamson |
| 2011/0078200 A1 | 3/2011 | Williamson |
| 2011/0131176 A1 | 6/2011 | Williamson |
| 2011/0131220 A1 | 6/2011 | Williamson |
| 2011/0158106 A1 | 6/2011 | Williamson |
| 2011/0161282 A1 | 6/2011 | Williamson |
| 2011/0161374 A1 | 6/2011 | Williamson |
| 2011/0161378 A1 | 6/2011 | Williamson |

OTHER PUBLICATIONS

Management of Multidimensional aggregates for Efficient Online Analytical Processing, Albrecht et al, Proceedings of the 1999 International Symposium on Database Engineering & Applications, pp. 156, 1999.*

Improving OLAP Performance by Multidimensional Hierarchical CLustering, Markl et al, Proceedings of the 1999 International Symposium on Database Engineering & Applications, pp. 165, 1999.*

ASPFAQ.com, "What Are the Valid Styles for Converting Datetime to String?," (2006) http://database.aspfaq.com/database/what-are-the-valid-styles-for-converting-datetime-to-string.html.

E. Pourabbas and A. Shoshani, "Answering Joint Queries from Multiple Aggregate OLAP Databases", in Proc. DaWaK, 2003, pp. 24-34.

Williamson, "Systems and Methods for Interpolating Conformal Input Sets Based on a Target Output," U.S. Appl. No. 12/872,779, filed Aug. 31, 2010.

Williamson, "Systems and Methods for Interpolating Conformal Input Sets Based on a Target Output," U.S. Appl. No. 12/951,881, filed Nov. 22, 2010.

Williamson, "Systems and Methods for Tracking Differential Changes in Conformal Data Input Sets," U.S. Appl. No. 12/951,937, filed Nov. 22, 2010.

Williamson, "Systems and Methods for Training a Self-Learning Network Using Interpolated Input Sets Based on a Target Output," U.S. Appl. No. 12/872,935, filed Aug. 31, 2010.

Williamson, "Systems and Methods for Embedding Interpolated Data Object in an Application Data File," U.S. Appl. No. 12/955,717, filed Nov. 29, 2010.

Williamson, "Systems and Methods for Generating Interpolated Input Data Sets Using Reduced Input Source Objects," U.S. Appl. No. 12/955,768, filed Nov. 229, 2010.

Williamson, "Systems and Methods for Filtering Interpolated Input Data Based on User-Supplied or Other Approximation Constraints," U.S. Appl. No. 12/955,790, filed Nov. 29, 2010.

Williamson, "Systems and Methods for Binding Multiple Interpolated Data Objects," U.S. Appl. No. 12/955,811, filed Nov. 29, 2010.

Williamson, "Systems and Methods for Generating Portable Interpolated Data Using Object-Based Encoding of Interpolated Results," U.S. Appl. No. 13/037,322, filed Feb. 28, 2011.

Williamson, "Systems and Methods for Generating Interpolation Data Sets Converging to Optimized Results Using Iterative Overlapping Inputs," U.S. Appl. No. 13/037,341, filed Feb. 28, 2011.

Williamson, "Systems and Methods for Generating Interpolation Data Template to Normalize Analytic Runs," U.S. Appl. No. 13/037,332, filed Feb. 28, 2011.

Williamson, "Systems and Methods for Validating Interpolation Results Using Monte Carlo Simulations on Interpolated Data Inputs," U.S. Appl. No. 13/037,344, filed Feb. 28, 2011.

USPTO, Office Action for U.S. Appl. No. 12/200,194, mailed Dec. 28, 2010.

USPTO, Office Action for U.S. Appl. No. 12/200,194, mailed May 9, 2011.

USPTO, Office Action for U.S. Appl. No. 12/200,194, mailed May 8, 2012.

USPTO, Office Action for U.S. Appl. No. 12/200,194, mailed Sep. 11, 2012.

* cited by examiner

SYSTEMS AND METHODS FOR HIERARCHICAL AGGREGATION OF MULTI-DIMENSIONAL DATA SOURCES

FIELD

The present teachings relate to hierarchical aggregation of multi-dimensional data sources, and more particularly to systems and techniques for aggregating multiple data sources having different dimensions into a unified hierarchical mapping for use by online analytic processing or other applications.

BACKGROUND OF RELATED ART

In networked data technologies, the introduction and expanded use of middleware platforms has enabled a wider range of applications access to a wider range of data sources. Middleware platforms in general are known which allow a single application to access diverse or incompatible data sources, by commonizing the data schema used by those separate sources for use by the application.

In the realm of data analysis, online analytic processing (OLAP) applications are known which are configured to receive data in standardized formats. OLAP applications in general manipulate data which is stored in a multi-dimensional format, and manipulate multi-dimensional data to generate reports, statistics, and other outputs. Middleware platforms which attempt to combine multiple data sources for purposes of feeding data to one or more OLAP application can encounter difficulties, however. Those issues include the fact that the diverse data sources will typically not be built with completely common or consistent dimensions. An OLAP application which wishes to attempt, for example, a sort of multi-dimensional data that is merged from multiple sources may find it impossible to locate the desired data at the correct dimension or hierarchy within the combined set of data. Thus, for example, an OLAP application configured to analyze sales data may not be able to sort sales of a given item on a given date, if for example date is not an explicit dimension of all data sources. It may be desirable to provide methods and systems for the hierarchical aggregation of data sources which permit diverse data sources having different defined dimensions to be mapped to or combined on common dimensions for OLAP or other uses, while preserving the data of the original data sources.

DESCRIPTION OF THE DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Embodiments of the present teachings relate to systems and methods for hierarchical aggregation of multi-dimensional data sources. More particularly, embodiments relate to platforms and techniques for accessing a set of OLAP or other data sources which can be configured in independent multi-dimensional schema, combining those data sources according to a hierarchical transform, and generating output based on that hierarchical aggregation. According to embodiments, the OLAP or other multi-dimensional data sources can be accessed to extract component data into an aggregate hierarchal mapping which demonstrates a hierarchical organization, combining common dimensions and elements of the original data sources. An OLAP application or other application can therefore perform sorting, searching, or other operations on the aggregate hierarchical object, without a need to perform any format manipulations on the source data.

In embodiments, the resulting hierarchical mapping can be recorded or represented in a hierarchical transform table containing entries for each dimension available in each data source, along with an index to a hierarchical level or position of that dimension in the combined hierarchal mapping. In embodiments, the original data sources can be preserved and not overwritten by the generation of the hierarchical transform table. In embodiments, the hierarchical mapping can be generated on the fly when an OLAP or other application presents a request for access to combined data from a set of data sources. These and other embodiments described herein address the various noted shortcomings in known online analytic technology, and provide a user or network operator with enhanced OLAP compatibility and data manipulation capabilities.

Reference will now be made in detail to exemplary embodiments of the present teachings, which are illustrated in the accompanying drawings. Where possible the same reference numbers will be used throughout the drawings to refer to the same or like parts.

Figure 1:
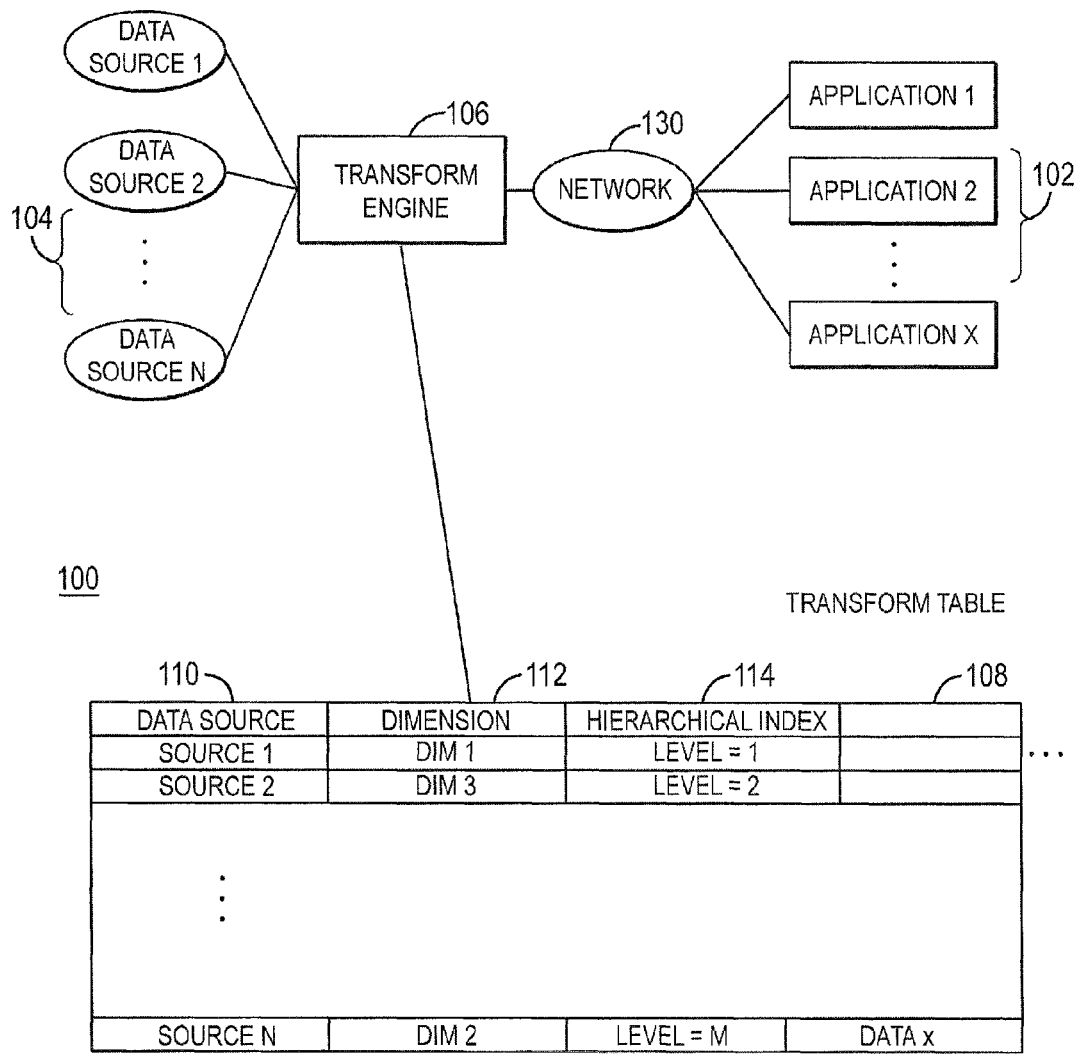
FIG. 1 illustrates an overall system for hierarchical aggregation of multi-dimensional data sources, according to various embodiments.

FIG. 1 illustrates an overall system 100 in which systems and methods for hierarchical aggregation of multi-dimensional data sources can operate, according to various embodiments. A set of applications 102 can communicate with a transform engine 106 via one or more network 130. Set of applications 102 can be or include, for example, a set of online analytical processing (OLAP) applications, such as database applications, statistical applications, spreadsheet applications, or other applications. One or more network 130 can be or include, for example, the Internet or other public or private networks. Transform engine 106 can be, include, or be hosted by a server with associated memory, storage, and other resources configured to receive data requests from one or more application in set of applications 102, and interpret that request to build a hierarchical data mapping or structure to respond to that request.

More particularly, and as shown in FIG. 1, transform engine 106 can communicate with a set of data sources 104 which host data which set of applications 102 wishes to access. The set of data sources 104 can be or include online analytic processing (OLAP) data sources, such as databases or other data stores. According to embodiments, the set of data sources 104 can be multi-dimensional data sources. For online analytic processing (OLAP) data sources within set of data sources 104, as understood by persons skilled in the art, the data sources can be configured in a three-dimensional "cube" format. In embodiments, other numbers, types, or configurations of multi-dimensional data can be used.

Transform engine 106 can receive a data request from one or more application in set of applications 102, and identify which data source or sources in set of data sources 104 contain data corresponding to the data request. Transform engine 106 can then communicate with data sources having corresponding data, and extract that data from the data sources. For example, one or more dimension of each data source can be read out or retrieved by transform engine 106. When all data corresponding to the data request is extracted from set of data sources 104, transform engine 106 can aggregate that data into a combined, hierarchical data mapping or data structure that can be accessed by the requesting application(s). More particularly, in embodiments transform engine 106 can generate a transform table 108 containing entries mapping the dimensions and/or fields extracted from the data sources in set of data sources 104 to a node or level in a tree or other hierarchical representation of the subject data. In embodiments, transform table 108 can contain fields including a data source field 110 identifying the data source which contributes a dimension, field, or other data. Transform table 108 can also include a dimension field 112 representing the original dimension of the extracted data in its host data source. Transform table 108 can further include a hierarchical index 114, representing a level at which the extracted dimension, field, or other data is placed in the resulting hierarchical data structure produced by transform engine 106.

Figure 2:
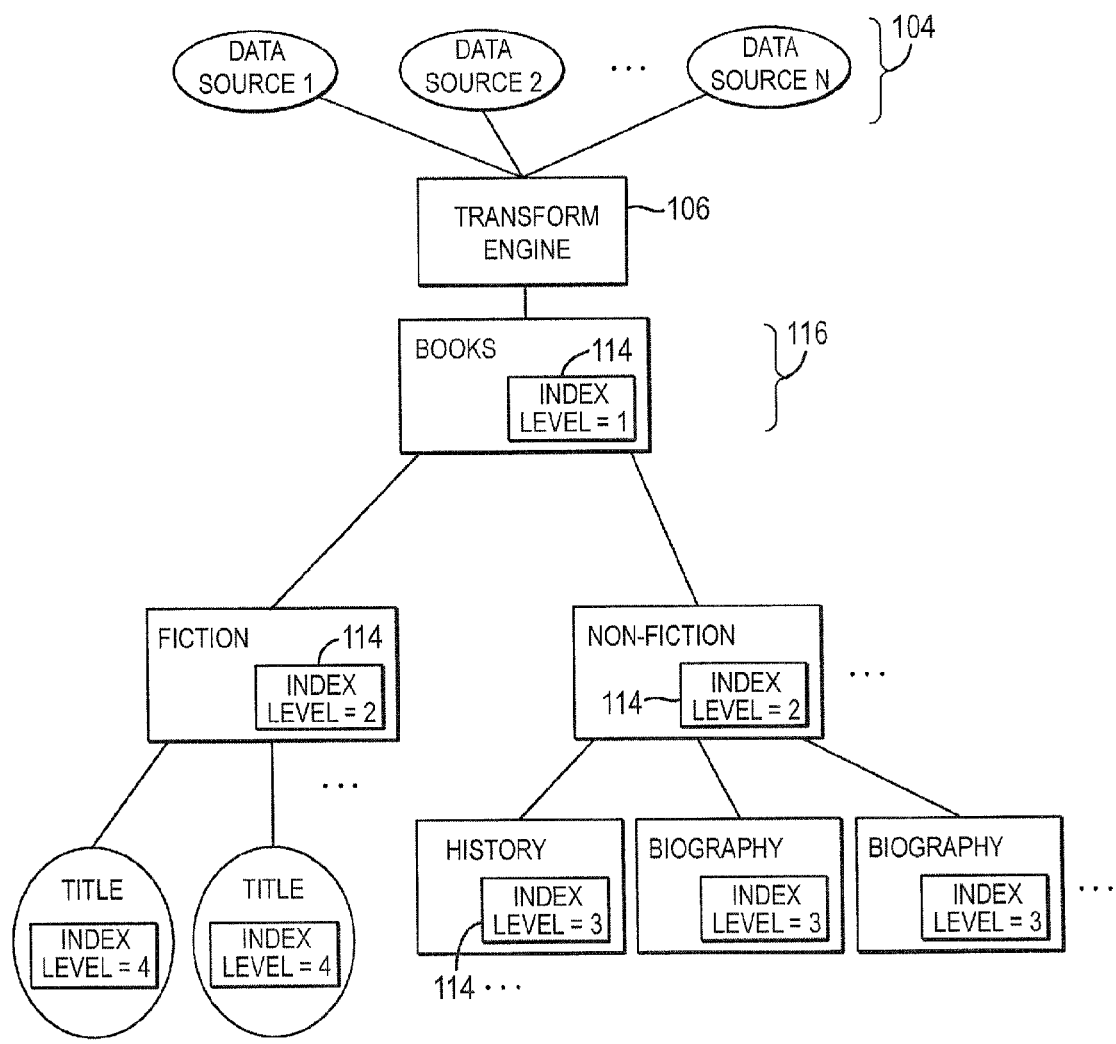
FIG. 2 illustrates an illustrative hierarchical mapping of data combined from different data sources, according to various embodiments.

As shown, for example, in FIG. 2, the hierarchical mapping 116 encoding the information extracted from set of data sources 104 can comprise a multiple-level hierarchical network. The hierarchical mapping 116 can, for instance, be configured as a set of linked nodes, in a descending or tree-type configuration. In illustrative embodiments as shown, for example, a hierarchical mapping 116 representing all book sales collected from retail, online, mail order, or other retail publishers or other sources can contain a number of distinct levels characterizing the inventory, sales, and other data for book transactions. The first level of hierarchical mapping 116 can be indicated by a hierarchical index 114 of 1, representing a media type of "book." The second level of hierarchical mapping 116 can be indicated by a hierarchical index 114 of 2, representing categories of "fiction" or "non-fiction" book inventory. The third level of hierarchical mapping 116 can be indicated by a hierarchical index 114 of 3, representing differing topic categories in each of fiction and non-fiction categories, such as novel, short story, history, biography, science, and so forth. As another illustration, hierarchical mapping 116 can, for instance, include a root or top most node at level 1 indicating a corporate entity as a "parent" in a corporate tree, beneath which lower-level nodes record subsidiary, division, joint venture partner, or other business relationships or affiliations, which inter-relationships can be defined by transform able 108 and associated hierarchical mapping 116. Other types, configurations, and levels of hierarchical mapping 116 are possible.

In embodiments, each node at a different level of hierarchical mapping 116 can encode or represent one dimension extracted from a data source in set of data sources 104. In embodiments, other mappings of dimensions to hierarchical mapping 116 can be used. It may be noted that by aggregating two or more dimensions from set of data sources 104 into a hierarchical mapping 116, hierarchical and other relationships can be established or encoded between dimensions, even if the original multi-dimensional data source did not include an explicit or implicit definition of the hierarchical position of a given dimension or its data fields to other dimensions or fields. Transform engine 106 can, for example, build hierarchical mapping 116 in one regard by identifying common dimensions, fields, or data between data sources in set of data sources 104.

In embodiments, the relationships or presumed relationships between other dimensions can be generated or projected using, for example, a set of lookup tables defining presumed hierarchical relationships between different keywords or other definitions of source dimensions. Thus, for instance, a dimension identified as "domestic sales" can be placed at a lower level in hierarchical mapping 116 than "overall sales" in a mapping of sales or financial data sources. In embodiments, relationships or presumed relationships between other dimensions can also be generated or projected using statistical inferences, or using neural networks or other self-learning logic. In embodiments, transform engine 106 can store hierarchical mapping 116 for further reference, for instance to a data store. In embodiments, transform engine 106 can generate hierarchical mapping 116, and not store that data to a permanent data store. In embodiments, transform engine 106 can extract data from set of data sources 104 and generate hierarchical mapping 116, without altering or destroying the original data contained in the data sources.

Figure 3:
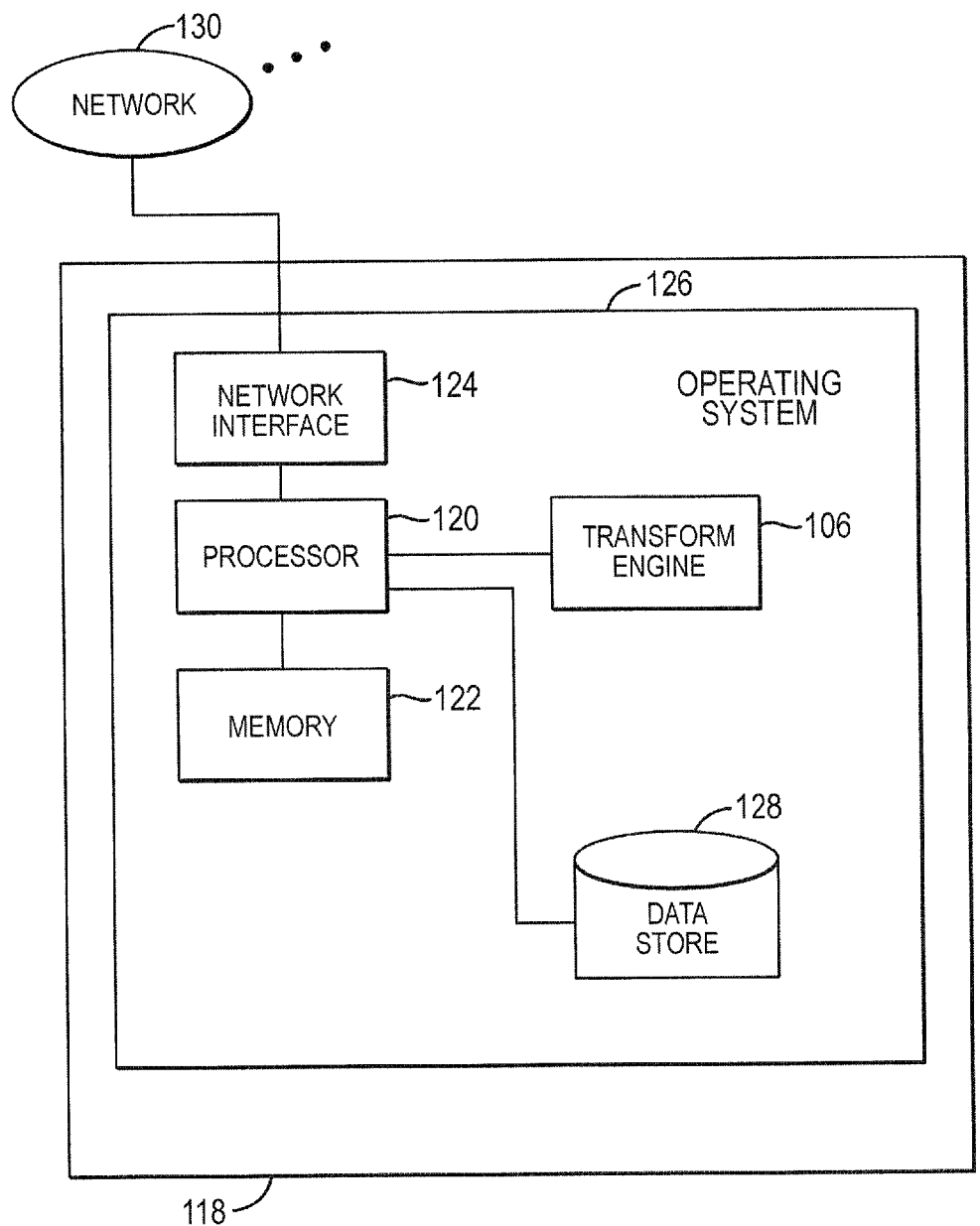
FIG. 3 illustrates an illustrative hardware configuration of hardware that can implement a transform engine, according to various embodiments.

FIG. 3 illustrates an exemplary configuration of transform server 118 which can be used in systems and methods for hierarchical aggregation of multi-dimensional data sources, according to embodiments. Transform server 118 can, for instance, support or host transform engine 106 in part or whole. In embodiments as shown, transform server 118 can comprise a processor 120 communicating with memory 122, such as electronic random access memory, operating under control of or in conjunction with operating system 126. Operating system 126 can be, for example, a distribution of the Linux™ operating system, the Unix™ operating system, or other open-source or proprietary operating system or platform. Processor 120 also communicates with data store 128, such as a database stored on a local hard drive. Processor 120 further communicates with network interface 124, such as an Ethernet or wireless data connection, which in turn communicates with one or more network 130, such as the Internet or other public or private networks. Processor 120 can, for example, communicate with set of applications 102 and set of data sources 104 via one or more network 130. Processor 120 also communicates with transform engine 106 and other resources to control the processing of set of data sources 104, including to extract the dimensional data from those sources, locate common dimensions and/or fields, and build transform table 108 reflecting the hierarchical aggregation of the data sources. Other configurations of transform server 118, associated network connections, and other hardware and software resources are possible.

Figure 4:
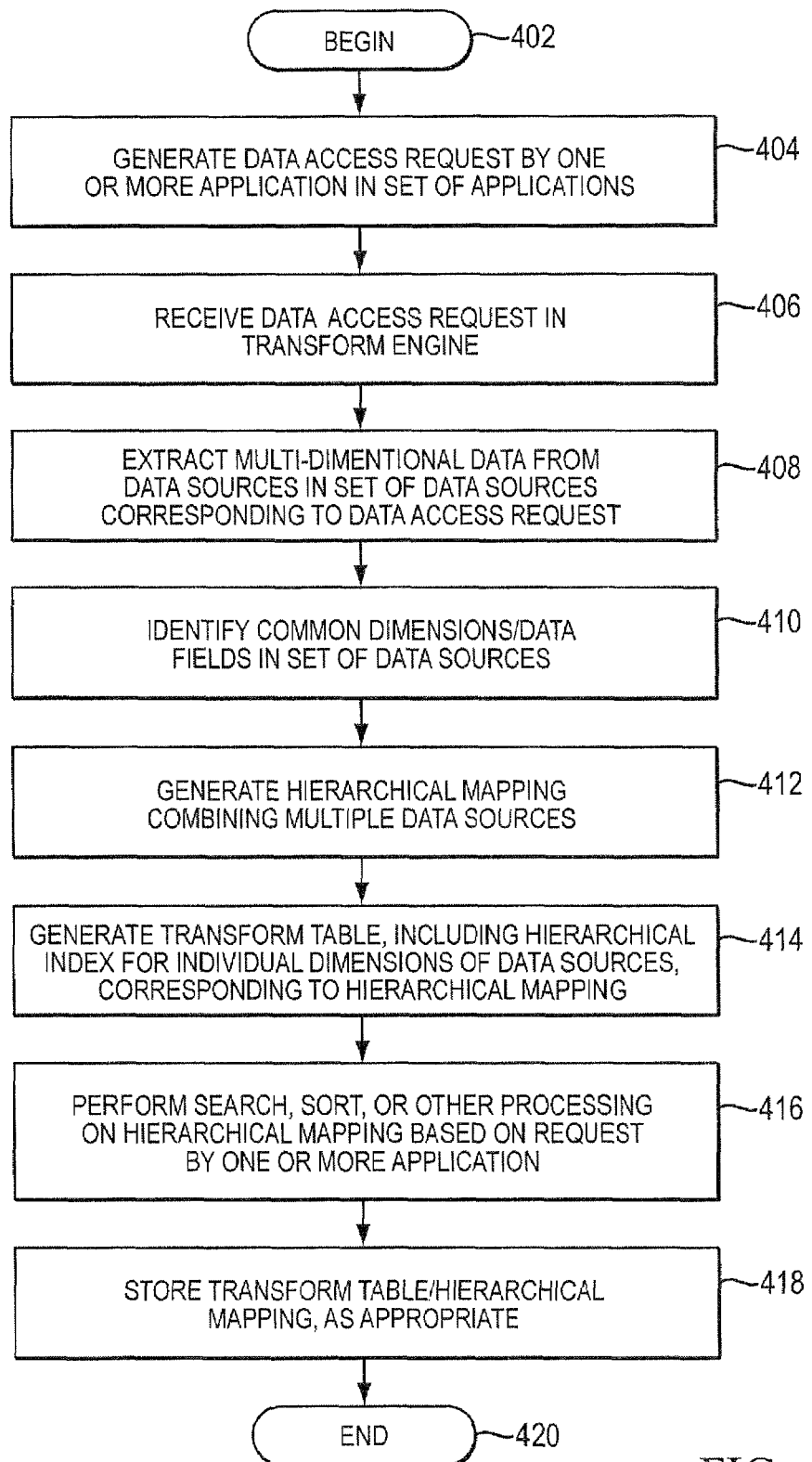
FIG. 4 illustrates overall data aggregation processing to generate hierarchical mappings from different data sources, according to various embodiments.

FIG. 4 illustrates overall aggregation processing of multi-dimensional data sources, according to various embodiments. In 402, processing can begin. In 404, a data access request can be generated by one or more application in set of applications 102. In 406, the data access request can be received in transform engine 106. In 408, multi-dimensional data corresponding to the data request can be extracted from set of two or more data sources in set of data sources 104 by transform engine 106. In 410, transform engine 106 can identify one or more dimensions, fields, or other data structures in common between the two or more data sources in set of data sources 104 supplying data in response to the data request. For example, transform engine 106 can discover that the data sources share a dimension of "book" which can be used to order or align common dimensions of the subject data sources.

In 412, transform engine 106 can generate a hierarchical mapping 116 representing a tree-type or other hierarchical ordering of the combined dimensions and/or other data of set of data sources 104 responsive to the data request. In 414, transform engine 106 can generate a transform table 108 reflecting the top-to-bottom or other ordering of the extracted dimensions of the data sources in set of data sources 104 related to the data request. In 416, one or more application in set of applications 102 can perform a search, sort, or other operation or type of processing on hierarchical mapping 116 generated by transform table 106. For example, in a retail sales context, a sorting of the top ten or other number of best-selling books in fiction, non-fiction, or other categories can be sorted for a given sales period. In 418, transform table 108, hierarchical mapping 116, and/or other data produced by the hierarchical aggregation of set of data sources 104 can be stored, for example, stored as a table, tree, or other data structure or format to data store 128, or other data store or repository. In 420, processing can repeat, return to a prior processing point, jump to a further processing point, or end.

The foregoing description is illustrative, and variations in configuration and implementation may occur to persons skilled in the art. For example, while embodiments have been described in which transform engine 106 generates and maintains a hierarchical mapping 116 by way of a transform table 108, in embodiments other structures for establishing and storing the relationship between source dimensions, data, and hierarchical mapping 116 or other aggregate output can be used. For further example, while embodiments have been described in which set of data sources 104 consist of or contain explicit OLAP databases, in embodiments other types or categories of data sources can be included in set of data sources 104. Similarly, while embodiments have been described in which set of applications 102 consist of or contain OLAP-based applications, in embodiments other types or categories of applications can access hierarchical mapping 116 and other data.

Yet further, while embodiments have been described in which a single transform engine 106 generates and manages transform table 108, in embodiments multiple transform engines, for example hosted on multiple servers, can cooperate to generate mappings between data sources and hierarchical mapping 116 and/or other output. Other resources described as singular or integrated can in embodiments be plural or distributed, and resources described as multiple or distributed can in embodiments be combined. The scope of the present teachings is accordingly intended to be limited only by the following claims.

What is claimed is:

1. A method comprising:
    receiving, by a transform engine executed by a processor, a data request from at least one application, wherein the transform engine is in communication with a set of multi-dimensional data sources;
    identifying, by the transform engine, multiple multi-dimensional data sources from the set of multi-dimensional data sources that contain data that corresponds to the data request;
    extracting, by the transform engine, the data corresponding to the data request from the identified multi-dimensional data sources;
    identifying, by the transform engine, multiple dimensions of the extracted data, wherein hierarchical relationships exist between ones of the identified dimensions within each of the identified multi-dimensional data sources;
    examining, by the transform engine, a lookup table defining presumed relationships between the identified dimensions to generate a new hierarchical relationship between ones of the identified dimensions from separate ones of the identified multi-dimensional data sources, wherein the separate ones of the identified multi-dimensional data sources do not explicitly or implicitly include a definition of the new hierarchical relationship;
    generating, by the transform engine, a hierarchical structure for the identified dimensions based on the existing hierarchical relationships and the new hierarchical relationship, wherein the hierarchical structure maps each one of the identified dimensions to one of multiple levels within the existing hierarchical relationships and the new hierarchical relationship, wherein the hierarchical structure comprises a set of ordered nodes, wherein each node in the set of ordered nodes corresponds to a dimension from the identified dimensions of the extracted data and a level from the levels in the hierarchical structure; and
    aggregating, by the transform engine, the extracted data into the hierarchical structure, wherein aggregating the extracted data comprises generating a transform table that stores, for each node in the set of ordered nodes, the dimension and the level of the node.

2. The method of claim 1, wherein the at least one application comprises multiple applications.

3. The method of claim 1, wherein the at least one application comprises an online analytical processing (OLAP) application.

4. The method of claim 1, wherein the set of multi-dimensional data sources comprises a set of online analytical processing (OLAP) data sources.

5. The method of claim 1, wherein the set of multi-dimensional data sources comprises a set of structured three-dimensional data sources.

6. A system comprising:
    an interface to receive a data request from at least one application, wherein the transform engine is in communication with a set of multi-dimensional data sources;
    a processor to execute a transform engine, in communication with the interface, the transform engine to:
    identify multiple multi-dimensional data sources from the set of multi-dimensional data sources that contain data that corresponds to the data request,
    extract the data corresponding to the data request from the identified multi-dimensional data sources,
    identify multiple dimensions of the extracted data, wherein hierarchical relationships exist between ones of the identified dimensions within each of the identified multi-dimensional data sources,
    examine a lookup table defining presumed relationships between the identified dimensions to generate a new hierarchical relationship between ones of the identified dimensions from separate ones of the identified multi-dimensional data sources, wherein the separate ones of the identified multi-dimensional data sources do not explicitly or implicitly include a definition of the new hierarchical relationship,
    generate a hierarchical structure for the identified dimensions based on the existing hierarchical relationships and the new hierarchical relationship, wherein the hierarchical structure maps each one of the identified dimensions to one of multiple levels within the existing hierarchical relationships and the new hierarchical relationship, wherein the hierarchical structure comprises a set of ordered nodes, wherein each node in the set of ordered nodes corresponds to a dimension from the identified dimensions of the extracted data and a level from the levels in the hierarchical structure, and aggregate the extracted data into the hierarchical structure, wherein aggregating the extracted data comprises generating a transform table that stores, for each node in the set of ordered nodes, the dimension and the level of the node.

7. The system of claim 6, wherein the at least one application comprises multiple applications.

8. The system of claim 6, wherein the at least one application comprises an online analytical processing (OLAP) application.

9. The system of claim 6, wherein the set of multi-dimensional data sources comprises a set of online analytical processing (OLAP) data sources.

10. The system of claim 6, wherein the set of multi-dimensional data sources comprises a set of structured three-dimensional data sources.

11. A non-transitory computer readable medium comprising executable program code which, when executed by a processor, causes the processor to perform a method comprising:

receiving, by a transform engine executed by the processor, a data request from at least one application, wherein the transform engine is in communication with a set of multi-dimensional data sources;

identifying, by the transform engine, multiple multi-dimensional data sources from the set of multi-dimensional data sources that contain data that corresponds to the data request;

extracting, by the transform engine, the data corresponding to the data request from the identified multi-dimensional data sources;

identifying, by the transform engine, multiple dimensions of the extracted data, wherein hierarchical relationships exist between ones of the identified dimensions within each of the identified multi-dimensional data sources;

examining, by the transform engine, a lookup table defining presumed relationships between the identified dimensions, to generate a new hierarchical relationship between ones of the identified dimensions from separate ones of the identified multi-dimensional data sources, wherein the separate ones of the identified multi-dimensional data sources do not explicitly or implicitly include a definition of the new hierarchical relationship;

generating, by the transform engine, a hierarchical structure for the identified dimensions based on the existing hierarchical relationships and the new hierarchical relationship, wherein the hierarchical structure maps each one of the identified dimensions to one of multiple levels within the existing hierarchical relationships and the new hierarchical relationship, wherein the hierarchical structure comprises a set of ordered nodes, wherein each node in the set of ordered nodes corresponds to a dimension from the identified dimensions of the extracted data and a level from the levels in the hierarchical structure; and aggregating, by the transform engine, the extracted data into the hierarchical structure, wherein aggregating the extracted data comprises generating a transform table that stores, for each node in the set of ordered nodes, the dimension and the level of the node.

12. The non-transitory computer readable medium of claim 11, wherein the at least one application comprises an online analytical processing (OLAP) application.

13. The non-transitory computer readable medium of claim 11, wherein the set of multi-dimensional data sources comprises a set of online analytical processing (OLAP) data sources.

* * * * *